July 21, 1970 J. F. TYSON 3,521,008

TELEPHONE INSTRUMENT

Filed March 31, 1967 9 Sheets-Sheet 1

INVENTOR
JOHN F TYSON
BY Peter Kirby
PATENT AGENT

TELEPHONE INSTRUMENT

Filed March 31, 1967 9 Sheets-Sheet 2

INVENTOR
JOHN F. TYSON
BY Peter Kirby
PATENT AGENT

INVENTOR
JOHN F. TYSON
BY Peter Kirby
PATENT AGENT

INVENTOR
JOHN F. TYSON
BY Peter Kirby
PATENT AGENT

INVENTOR
JOHN F. TYSON
BY Peter Kirby
PATENT AGENT

INVENTOR
JOHN F. TYSON
BY Peter Kirby
PATENT AGENT

TELEPHONE INSTRUMENT

Filed March 31, 1967

INVENTOR
JOHN F TYSON
BY Peter Kirby
PATENT AGENT

INVENTOR
JOHN F. TYSON
BY Peter Kirby
PATENT AGENT

TELEPHONE INSTRUMENT

Filed March 31, 1967 9 Sheets-Sheet 9

INVENTOR
JOHN F. TYSON
BY
PATENT AGENT

United States Patent Office 3,521,008
Patented July 21, 1970

3,521,008

TELEPHONE INSTRUMENT

John F. Tyson, Ottawa, Ontario, Canada, assignor to Northern Electric Company Limited, Montreal, Quebec, Canada Filed Mar. 31, 1967, Ser. No. 627,372
Claims priority, application Canada, Oct. 31, 1966, 974,468
Int. Cl. H04m *1/02*
U.S. Cl. 179—100 10 Claims

ABSTRACT OF THE DISCLOSURE

A telephone instrument for use as a wall or table instrument without modification to the structure of the base or the handset. The base is formed with a socket having surfaces shaped for receiving and retaining an angulated handset in any one of three positions:

(a) a fully housed normal position in which the switch hook is actuated—this position is the same for a table instrument (FIG. 7) as for a wall instrument (FIGS. 11 and 12);

(b) a second hanging position in which the switch hook is not actuated (FIGS. 13 and 14); and (c) a third position for table use in which the handset is in a reversed position (FIG. 15), and the switch hook is not actuated.

This invention relates to improvements in the housing structure of a telephone instrument, that is to say to the structure itself and the particular arrangement and location of the surfaces and parts thereof that enable the instrument to perform certain useful functions and to be used in certain advantageous ways, without specific regard to the details of the electrical equipment that the structure will be called upon to house, such electrical equipment being assumed to be conventional or, in any case, not to be germane to the present inventive advances.

The specific description that follows describes a number of examples of such a housing structure, consisting essentially of a handset, and a base including a socket for cradling the handset. The various structures described below exhibit a number of advantages over the previously known or proposed devices designed to serve the same general purpose, but it is to be understood that such specific descriptions are provided by way of example only, and not by way of limitation of the present inventive advances, which latter in their broad scopes are defined in the appended claims.

Subject to these considerations, it may nevertheless be stated that the various examples of the invention illustrated in the accompanying drawings exhibit certain important and specific features, to the nature of which it is desired to direct special attention in order to facilitate an appreciation of the merits of the structures described.

A first of such features concerns the ability of the preferred form of structure described herein to serve with equal utility as either a table instrument in a horizontal orientation or as a wall instrument in a vertical orientation. This facility is realized without any need to modify either the base or the handset. The manufacturing and commercial advantages will be clearly evident of this arrangement by which single mold shapes for both the base and the handset (whether for use as table or wall instruments) are employed.

A second valuable feature of the structural concept described is the provision of means in the socket to serve in the wall application of the instrument as a surface to support the handset without actuating the switch hook, such facility being commonly referred to as a "third party call hook." In the present construction such surface is disposed in a novel location in which the handset is held more securely than hitherto and in which the handset may be more conveniently placed in this third party position and retrieved therefrom by the user. In addition, the location of this third party call hook surface is such as to cause it to be obscured in the normal housed position of the handset. This latter feature is especially advantageous when the instrument is used in the horizontal orientation, since, when the instrument is so used, it is likely to be located on a desk or table in close vicinity to other objects, under which conditions it is highly desirable to avoid or minimise protruding surfaces or portions on the instrument that could interfere with other adjacent objects or with easy access to the instrument itself. In addition to these advantages, the location of the third party call hook in the present construction is such that its availability and utility may be more readily apparent to the user than third party call hooks embodied in prior equipment.

A third valuable feature of the structural concept described resides in its adaptability to so-called "modulation" of the base portion of the instrument, that is to say, the ease with which the base portion can be extended (or shortened) to meet varying requirements in relation to the amount and nature of the electrical or control components to be housed in such base, this variability being substantially independent of the fundamental shape of the base and being especially independent of the manner in which the handset is supported in the base. Expressing this advantage in another way, it can be said that the structures herein described avoid the disadvantages of a so-called "terminal design," namely a design or shape that cannot be conveniently dimensionally modified (more specifically extended in a desired direction) without giving rise to needs for basic changes.

As well as the advantages that such a "non-terminal" or "modulatable" shape has in terms of manufacturing economy, it especially lends itself to the generation of a so-called "family image" in a line or series of instruments, each being designed to perform a slightly different function and each having varying amounts of electrical equipment, while each nevertheless embodying fundamentally the same shape of base, handset and socket; the same manner of mounting the handset in the socket in the base; and the same manner of cooperation between the base and the handset. Such a "family image" facility can be expected to be especially attractive to a manufacturer who anticipates a demand for various "modulated" versions of a basic instrument.

Yet another feature of the structural concept described resides in a facility to mount the handset firmly in a reversed seating position in the horizontal orientation of the instrument, such position being usable either as a third party call position, or alternatively, as a position in which to rest the handset during dialing, in those embodiments in which the dialing mechanism is mounted in the handset.

In addition to this latter aspect, namely that in some embodiments the dialing mechanism be mounted in the handset, another feature of the apparatus described is the location of the switch hook in the handset in a novel position for actuation by a projecting surface of the socket, when the handset is placed in cradled position therein.

It is believed that the manner in which these advantageous features can be realized by the structures herein described will be more readily apparent from a consideration of the accompanying drawings together with the following description which relates specifically thereto.

Figure 7A:
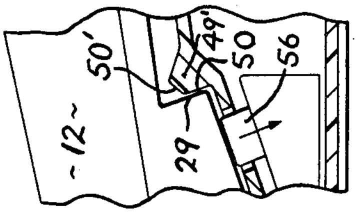
FIG. 7 is a large scale cut-away side view of the base of the housing structure with the handset mainly shown in elevation.
Figure 7:
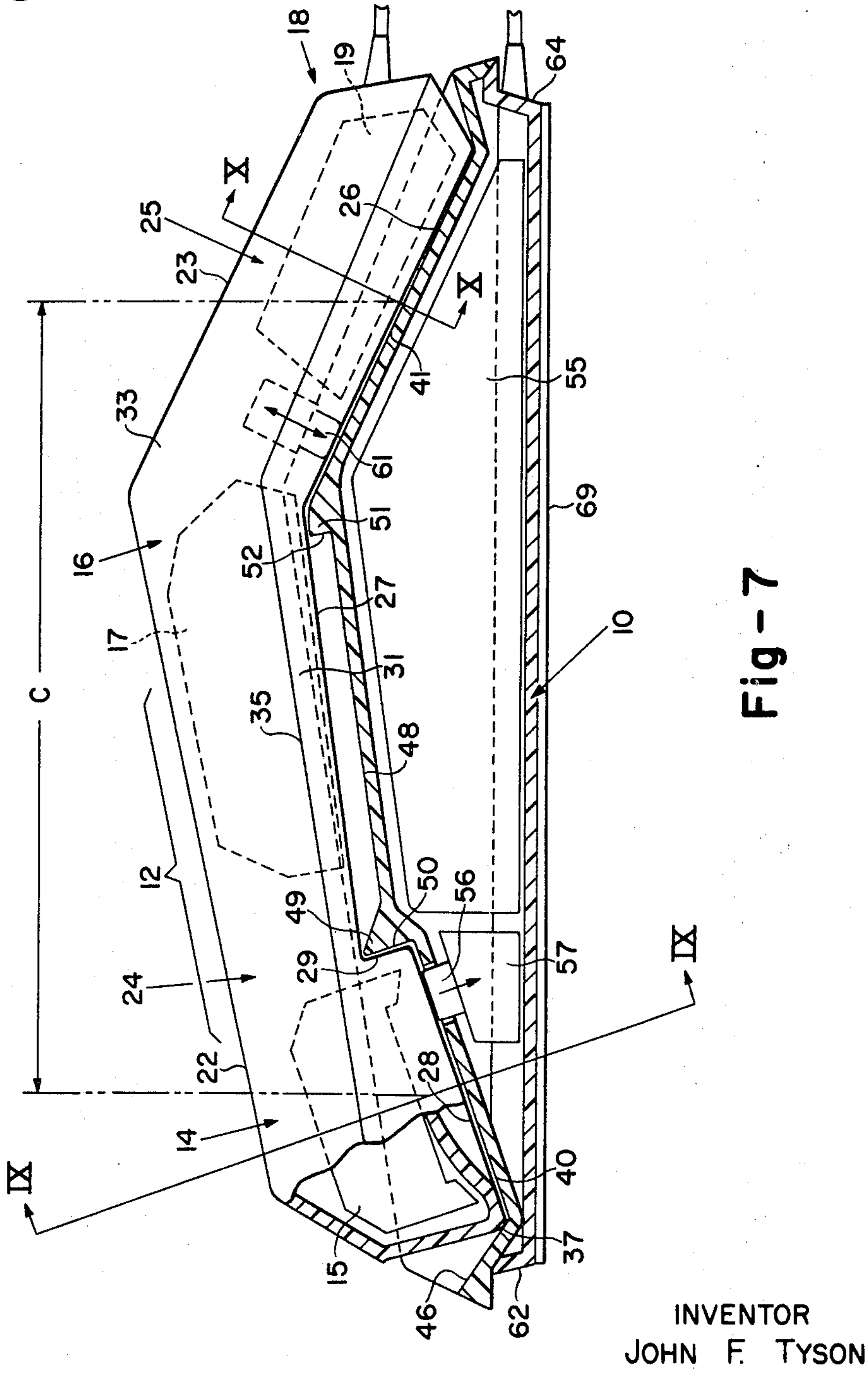
Figure 8:
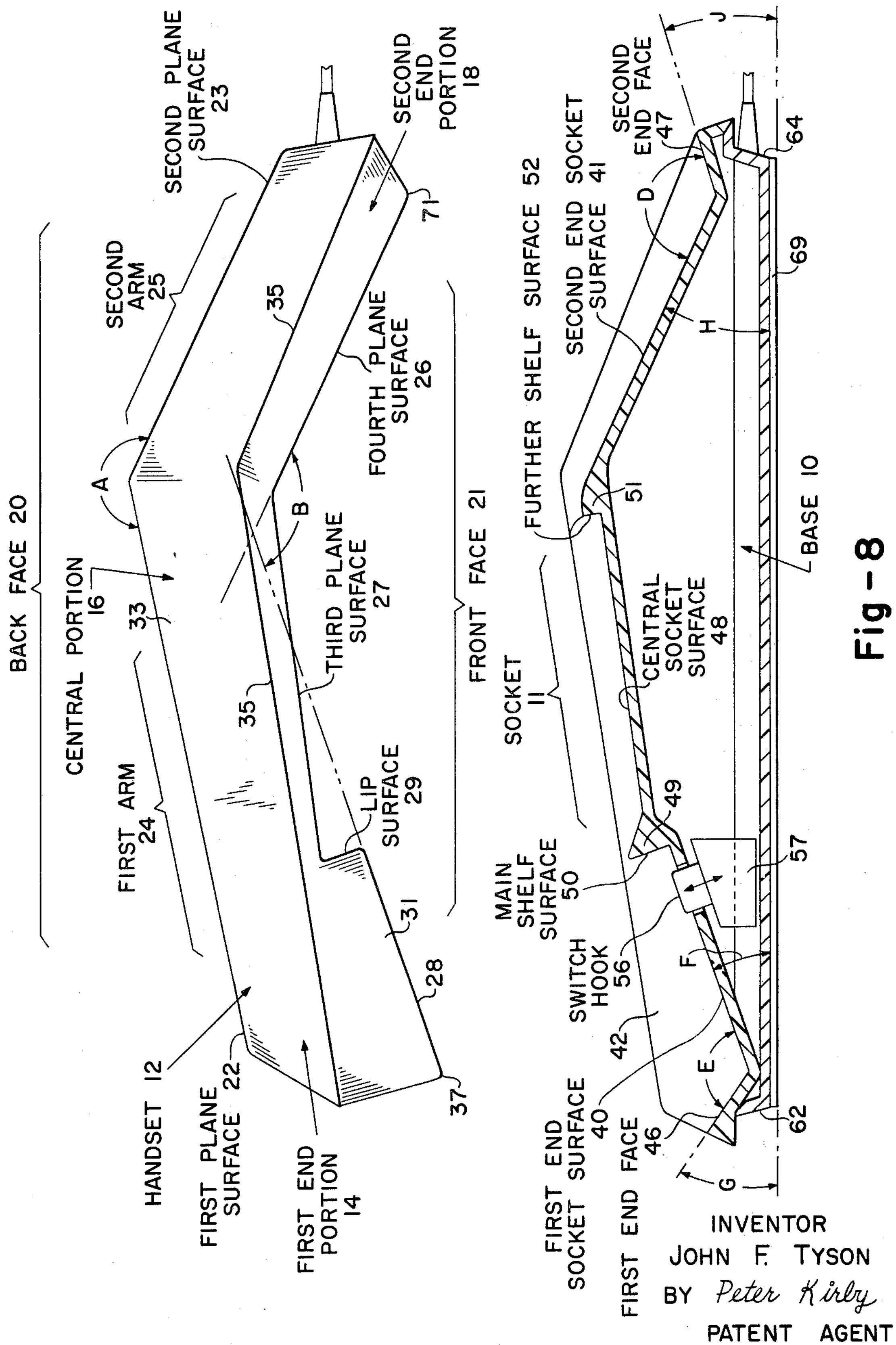
Figure 9:
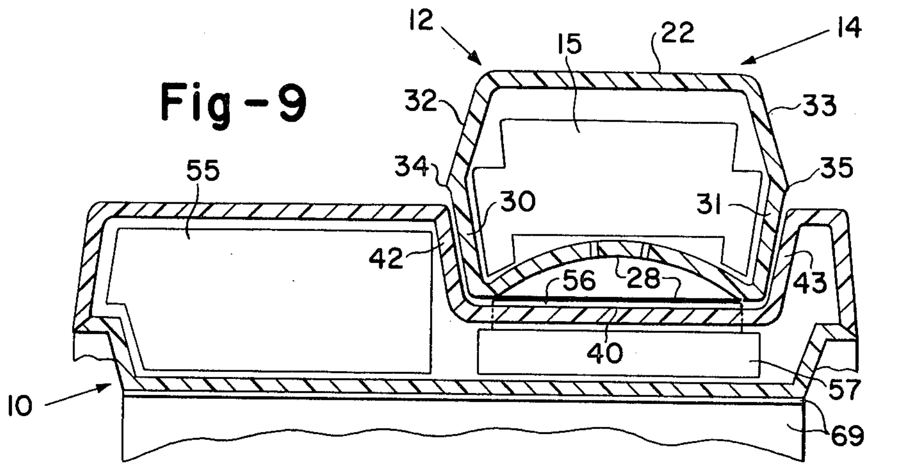
Figure 10:
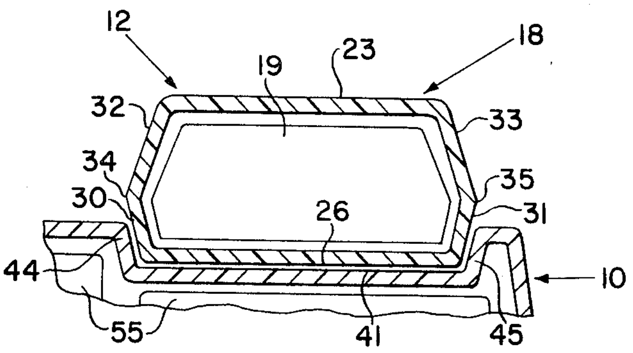
Figure 11:
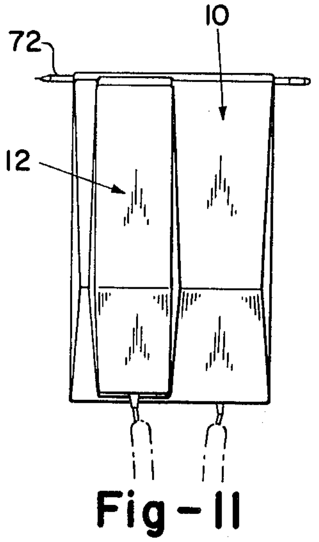
Figure 13:
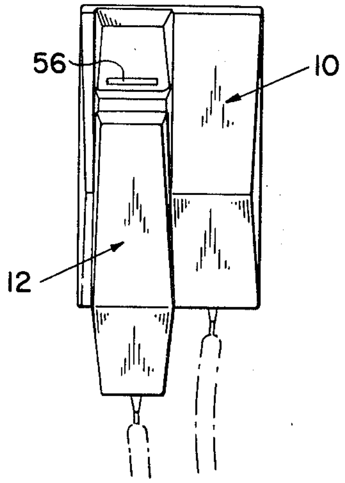
Figure 16:
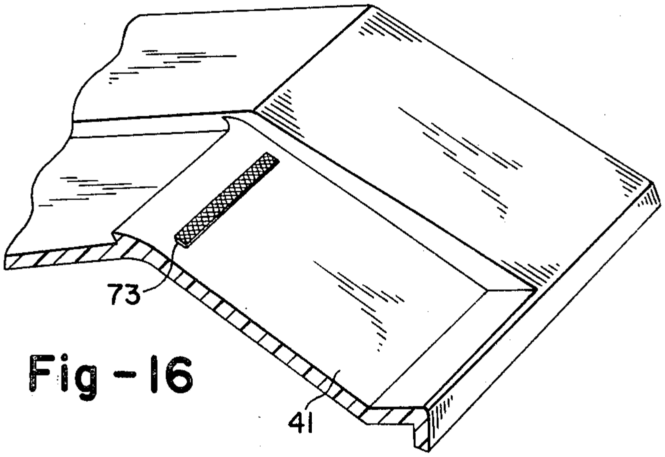
Figures 12, 14:
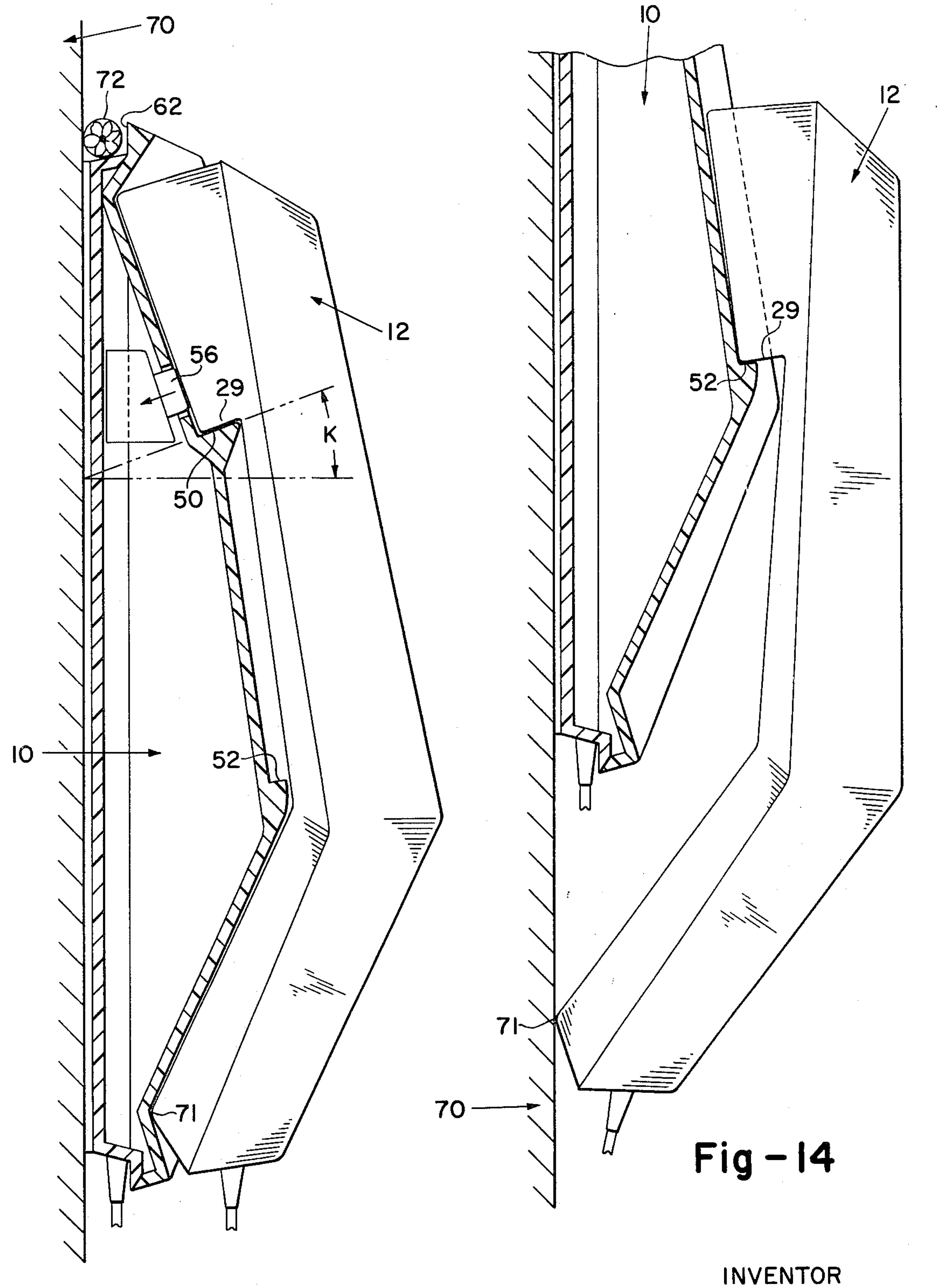
Figure 15:
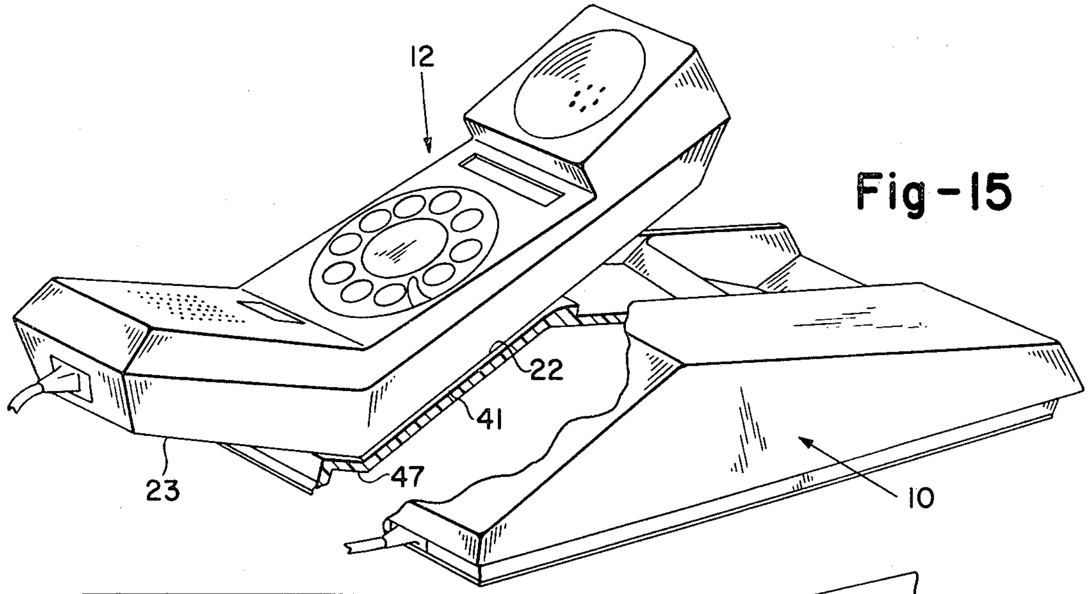
Figure 18:
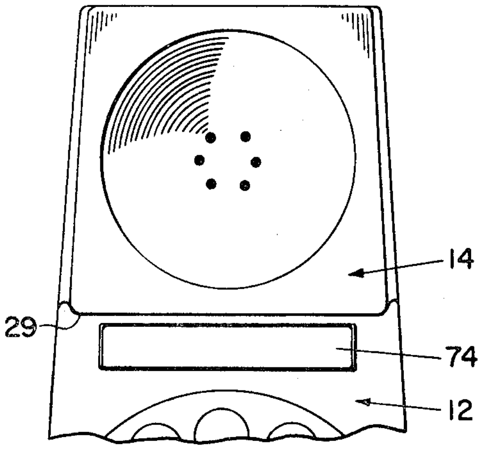
Figure 17:
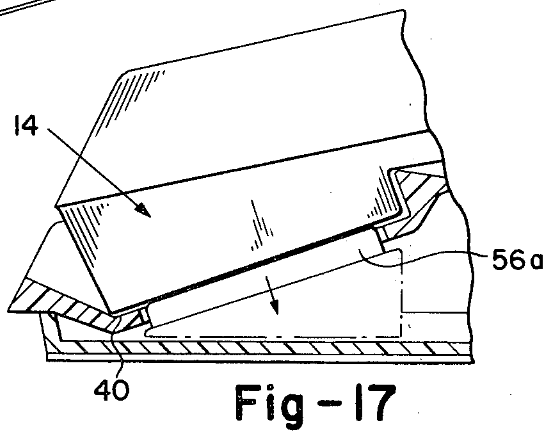
Figure 19:
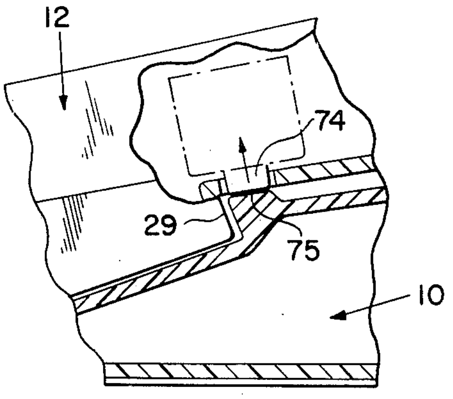
Figure 20:
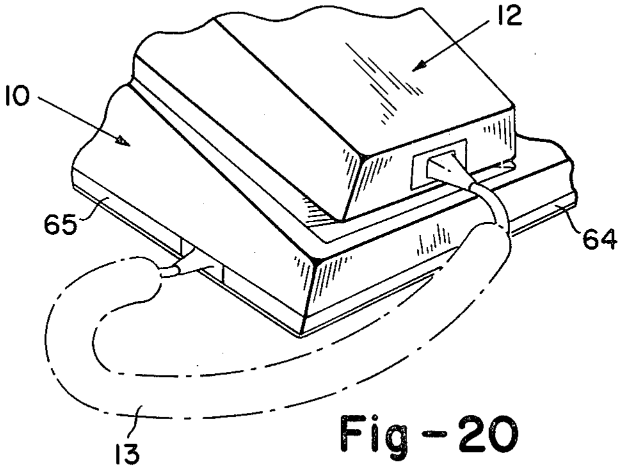
Figures 21, 22, 23, 24, 25, 26, 27:
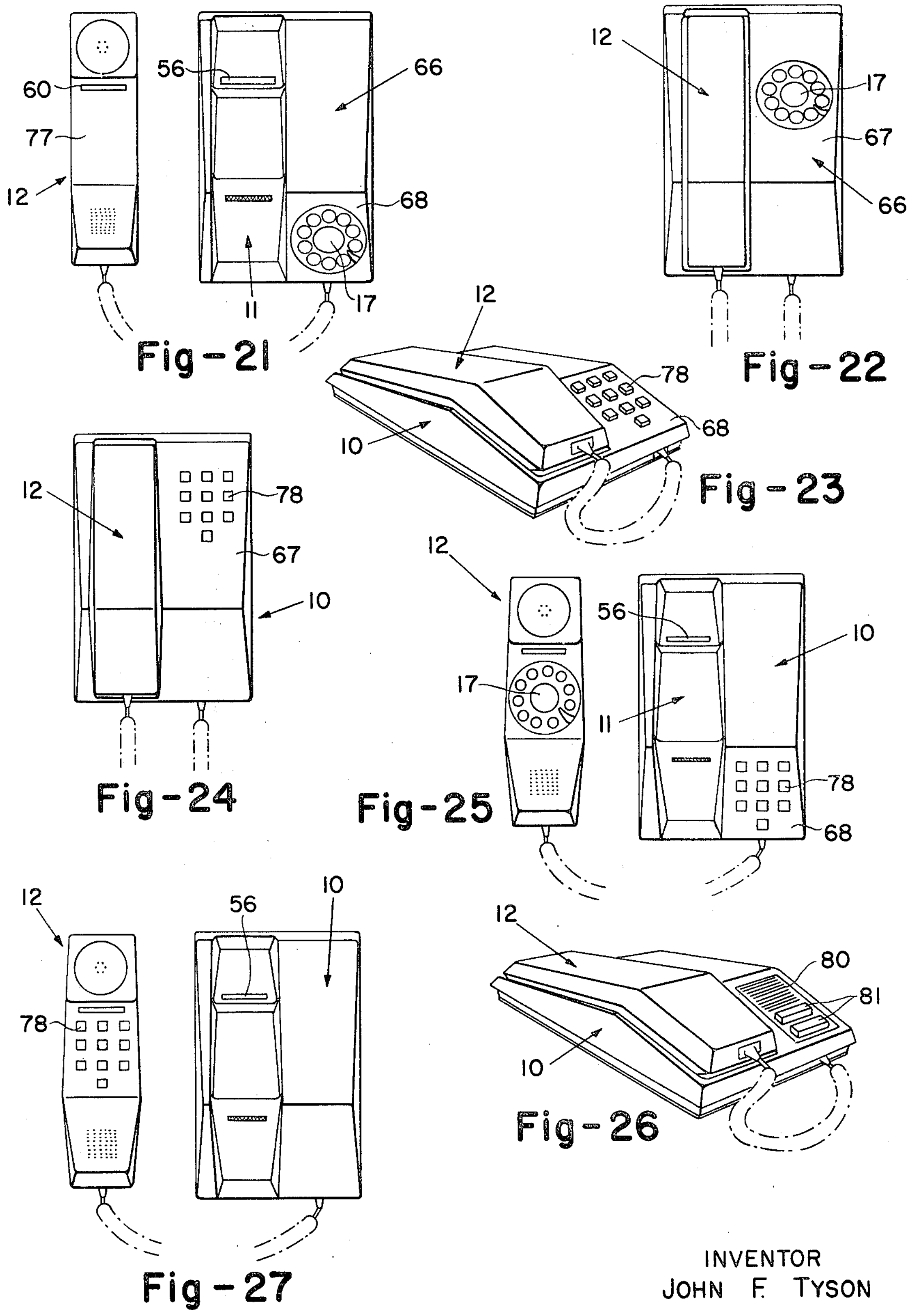

FIG. 7*a* is a fragment of FIG. 7 showing a modification;

FIG. 8 is a view generally similar to FIG. 7 but with the handset raised above the base;

FIG. 9 is a section on IX—IX in FIG. 7;

FIG. 10 is a section on X—X in FIG. 7;

FIG. 11 is a front view of the apparatus in a vertical orientation mounted on a wall;

FIG. 12 is a cut-away side view of the arrangement of FIG. 11;

FIG. 13 is a view corresponding to FIG. 11 showing the handset in a second position;

FIG. 14 is a cut-away side view of the arrangement of FIG. 13;

FIG. 15 is a perspective, partly cut-away view, showing the base in a horizontal orientation and the handset in a reversed seating position;

FIG. 16 is a cut-away fragmentary view of a modification to the socket surface to improve the stability of the FIG. 15 position;

FIG. 17 is a fragmentary end view of the apparatus showing a modified form of switch hook;

FIG. 18 is a fragmentary front view of an alternative form of handset;

FIG. 19 is a fragmentary cut-away side view showing the cooperation of the handset of FIG. 18 with a modified base;

FIG. 20 is a fragmentary perspective view of the front of the apparatus showing another modification;

FIG. 21 is a front view of a further modified apparatus;

FIG. 22 is a front view of yet another modification;

FIG. 23 is a front perspective view of a still further modification;

FIG. 24 is a front view of a variant of FIG. 23;

FIG. 25 shows a front view of another form of the apparatus;

FIG. 26 shows a perspective front view of a further form;

FIG. 27 shows a front view of a further embodiment; and

Figures 28, 29:
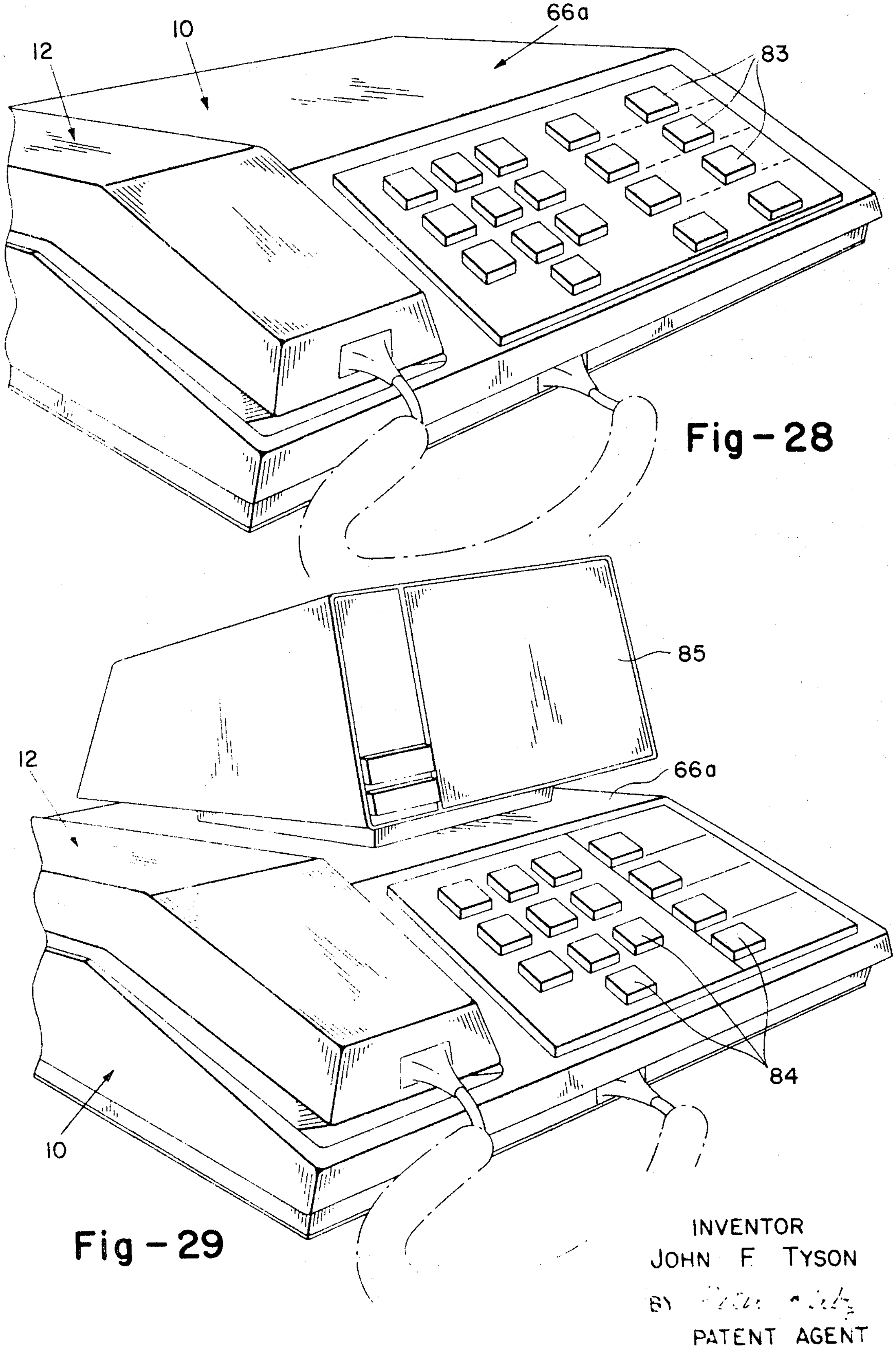

FIGS. 28 and 29 show front perspective views of still further variants of the basic apparatus.

The structure shown in FIGS. 1 to 10, comprises a base 10 defining a socket 11 shaped to receive and removably retain an elongated handset 12, while a conventional cord 13 joins the handset 12 to the base 10 in the usual way.

The handset 12 comprises a first end portion 14 for housing a conventional receiver 15; a central portion 16 for housing a rotary dialing mechanism 17; and a second end portion 18 for housing a conventional transmitter 19. The handset 12 also presents a back face 20 and a front face 21, the back face 20 consisting of a first planar surface 22 extending over the first end portion 14 and the central portion 16, and a second planar surface 23 that extends over the second end portion 18. At the front of the handset, the end portion 18, the central portion 16 and the end portion 14 respectively define planar front surfaces 26 and 27 and a centrally concave front surface 28.

The handset 12 may be considered as composed of a pair of arms 24 and 25, the two planar back surfaces 22 and 23 of which define between them an outer angle A of approximately 225°, which is the preferred value for this angle in order conveniently to shape the handset 12, i.e. to shape it into the angulated form shown in the drawings which is well suited to convenient use by the subscriber. The angle A may, however, be varied to suit individual applications. The value of this angle A, to which is closely related the value of the angle B defined between the front surfaces 26 and 28 is also related to the longitudinal dimension C (typically 14 cms.) between the approximate centres of the end portions 14 and 18, these considerations being, of course, primarily determined by the typical dimensions of the human head and the practical requirements of usage of a telephone handset. Thus, while the dimensions mentioned above have been found convenient for practical use (a typical value for the angle B being about 135°), it is to be understood that variations in all these dimensions are fully contemplated within the present disclosure.

At the front face 21 of the handset the boundary between the central surface 27 and the front surface 28 of the first end portion 14 is constituted by a lip or indented surface 29 extending across the full width of the handset.

As best appreciated from FIGS. 9 and 10, the handset 12 is formed throughout its length with downwardly and inwardly tapering lower side walls 30 and 31 that join respective upwardly and inwardly tapering walls 32 and 33 to form ridges 34 and 35 that facilitate grasping of the handset by the user in order to lift it out of the socket 11.

The tapering of the lower side walls 30 and 31 facilitates snug seating of the handset 12 in the socket 11 which consists principally of first and second end socket surfaces 40 and 41 for receiving respectively the first and second end portions 14 and 18 of the handset 12. The bottom socket surface 40 extends laterally into outwardly and upwardly tapering walls 42 and 43, while the bottom socket surface 41 extends likewise into outwardly and upwardly tapering side walls 44 and 45.

At one end of the socket 11 the first end socket surface 40 joins an inwardly and relatively gradually downwardly inclined first end face 46, defining an angle E therewith. Such reference to "downward" inclination is related, as have been all the foregoing references to "upward" and "downward," to an assumption that the base 10 is horizontally oriented for use as a table instrument. Separate reference will be made below to the alternative orientation of the structure as a wall instrument. At the other end of the socket 11, the second end socket surface 41 defines an angle D with a similar downwardly and inwardly sloping second end face 47. The significance of the angles D and E will be explained below.

The boundary between the end socket surface 40 and a central socket surface 48 is formed by a projection or projecting ridge 49 that defines a main overhanging shelf surface 50, while the boundary between the central socket surface 48 and the second end socket surface 41 is formed by a second projecting ridge 51 that defines a further shelf surface 52.

In addition to conventional electrical equipment (including a ringer) illustrated merely in general outline at 55, the base 10 serves to house a so-called switch hook 56 with its related switch mechanism 57. The electrical function of these latter parts is conventional, i.e. when the switch hook 56 is depressed by the handset, it disconnects the handset electrical equipment from the line, and, when released, re-connects such equipment to the line so that a call can be made. The electrical function of the switch hook 56 is thus entirely conventional, although its manner of mechanical actuation is not. As is clearly seen in FIGS. 7 and 9, when the handset 12 is cradled in the socket 11, the switch hook 56 is depressed by the flat portion of the surface 28 adjacent the lip 29, since only the central portion of the surface 28 is formed into a shallow concavity.

It is desired especially to draw attention to the fact that the handset is cradled in a very stable manner in the socket 11. Any tendency for the handset to move outwardly of the socket in the direction with the first end portion 14 of the handset leading i.e. to the left in FIG. 7, is inhibited by two factors, firstly by the socket end face 46, up which the tip 37 of the end portion 14 would have to climb for such movement to take place, and secondly by the cooperation and inclination of the touching surfaces 26 and 41 at the other end of the handset.

Indeed these two sets of cooperating surface means not only inhibit outward movement of the handset to the left in FIG. 7, they actually positively urge the handset longitudinally inwardly into its proper snug seating position, i.e. its normal, forward, most inward position in the socket, in the event that it was placed down on the base by the user slightly longitudinally misaligned with the socket at a location to the left of its correct position in FIG. 7. In the reverse sense of longitudinal misalignment of the handset, i.e. to the right in FIG. 7, outward travel is positively prevented by cooperation of the lip and shelf surfaces 29 and 50, while the function of urging the handset into its correct position, if it should be set down too far to the right, is performed by the end face 47.

Thus, the overall shape of the socket is especially conducive to smooth and easy sliding of the handset into its proper location in the socket, should the handset initially be presented by the user to the base with a measure of misalignment with the socket, and this statement is true whether such misalignment is in the longitudinal direction of the socket, or the transverse direction of the socket, or with some combination of the two. An important contributing factor to this facility, especially as far as transverse misalignment is concerned, is the fact that the side walls 42 and 43 of the end socket portion project upwardly at least as far as, and preferably a little higher than the projection 49.

In a modification of FIG. 7, shown in FIG. 7*a*, the projecting ridge 49 of FIG. 7, has been replaced by a modified ridge 49′ which is still formed with a main shelf surface 50 but terminates in an oppositely inclined outer surface 50′. This modification has been found further to facilitate sliding of the handset 12 into the socket 11 from a position of the handset slightly longitudinally misaligned with such socket and displaced to the right as seen in FIGS. 7 and 30, i.e. under conditions in which the lip surface 29 of the end portion 14 is required to slide over the top of the ridge 49 before falling into place in the socket. By forming the ridge 49′ with the additional surface 50′, the function which the end face 47 already performs, namely that of urging a longitudinally misaligned handset into the socket is thus assisted by the surface 50′ which slopes in the same direction as the end face 47.

It should be noted that, while not critical interms of any exact number of degrees, the value of the angle E in general terms is important, in that, if this angle were made too large, the usefulness of the face 46 in helping to urge the handset firmly into the socket in the horizontal orientation, would be diminished, while, if this angle were made too small, difficulty could be experienced in readily inserting the handset into the socket and removing it therefrom, bearing in mind that a small amount of leftward movement of the handset, as seen in FIG. 7, must accompany any upward movement in order to ensure adequate clearance for the lip and shelf surfaces 29 and 50 as the handset is removed from the socket, and vice versa when the handset is inserted into the socket.

The preferred slopes for the surface 40 and end face 46 to the horizontal (as defined by the angles F and G in FIG. 8) are respectively 20° and 35°, which gives the angle E a value of 125°. Having regard to the considerations of the immediately preceding paragraph, the angle G may be varied between values within a preferred range of about 30° to 50° or an extreme range of about 25° to 55°. The angle H that the surface 41 makes with the horizontal in the preferred form is approximately 25°; and the angle J of the face 47 is preferably about 20°, which makes the preferred value for the angle D, 135°.

Other parts of the apparatus shown in FIGS. 1 to 10 but not yet described include a rectangular depression 60 (FIG. 6) in the front face of the handset designed to receive a name plate or other desired indicia, and a recall switch 61 (FIGS. 6 and 7) which is a known device electrically connected to serve the same function as the switch hook 56. The recall switch 61 is provided on the handset as a convenient means for interrupting the circuit, should the user make an error in dialing. He need merely depress the switch 61 and start dialing again. In addition, it should be noted that the base 10 is formed with recessed portions 62 to 64 forming, in effect, a groove around the full perimeter of the base at its lowermost part. If desired, the undersurface of the base 10 may also be provided with an underpad 69 of cork, rubber or other suitable material (see FIGS. 7 and 8).

It should also be mentioned that, while no openings into the interior of the base 10 have been specially shown in the drawings, such openings will be provided at one or more suitable locations (such as around the grooves 62–65, or in the side surfaces of the base itself), assuming that the base is employed to house a ringer along with the other conventional electrical equipment, such openings being necessary in these circumstances to afford effective acoustic coupling between the ringer and the exterior of the apparatus. By the same token, a control lever (not shown) for varying the loudness of the ringer, may be provided to extend to the exterior of the base at a suitable location for manipulation, and one or more illuminating lights may be provided at convenient locations in either the base or the handset or both.

Figure 1:
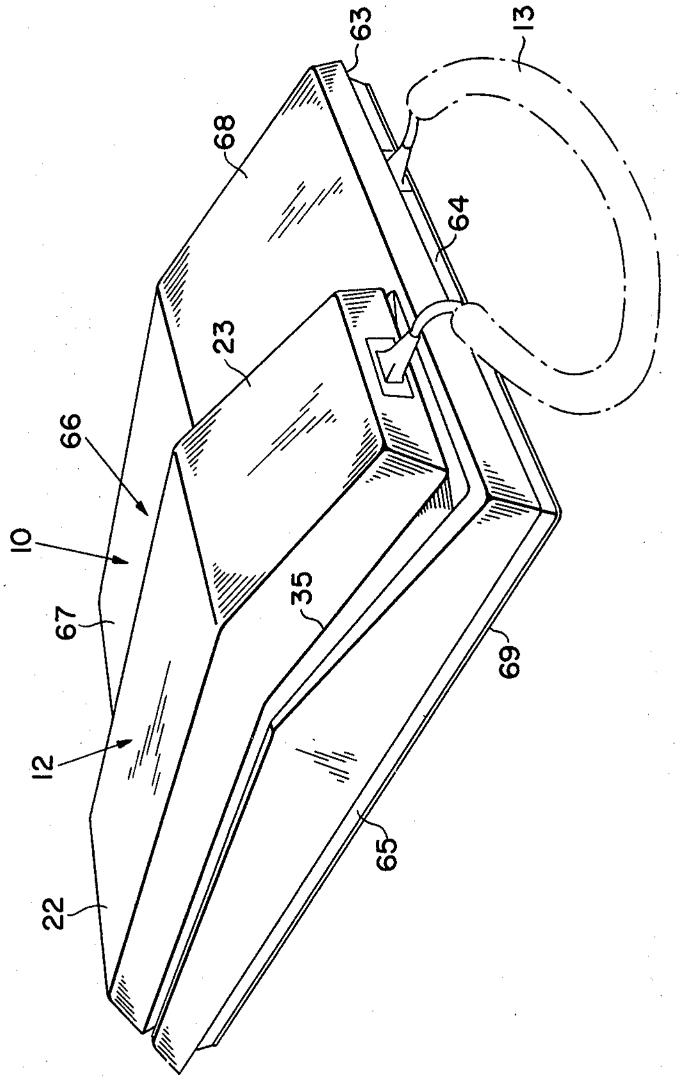
FIG. 1 is a perspective front view of apparatus constituting a telephone instrument housing structure.
Figures 2, 3, 4, 5, 6:
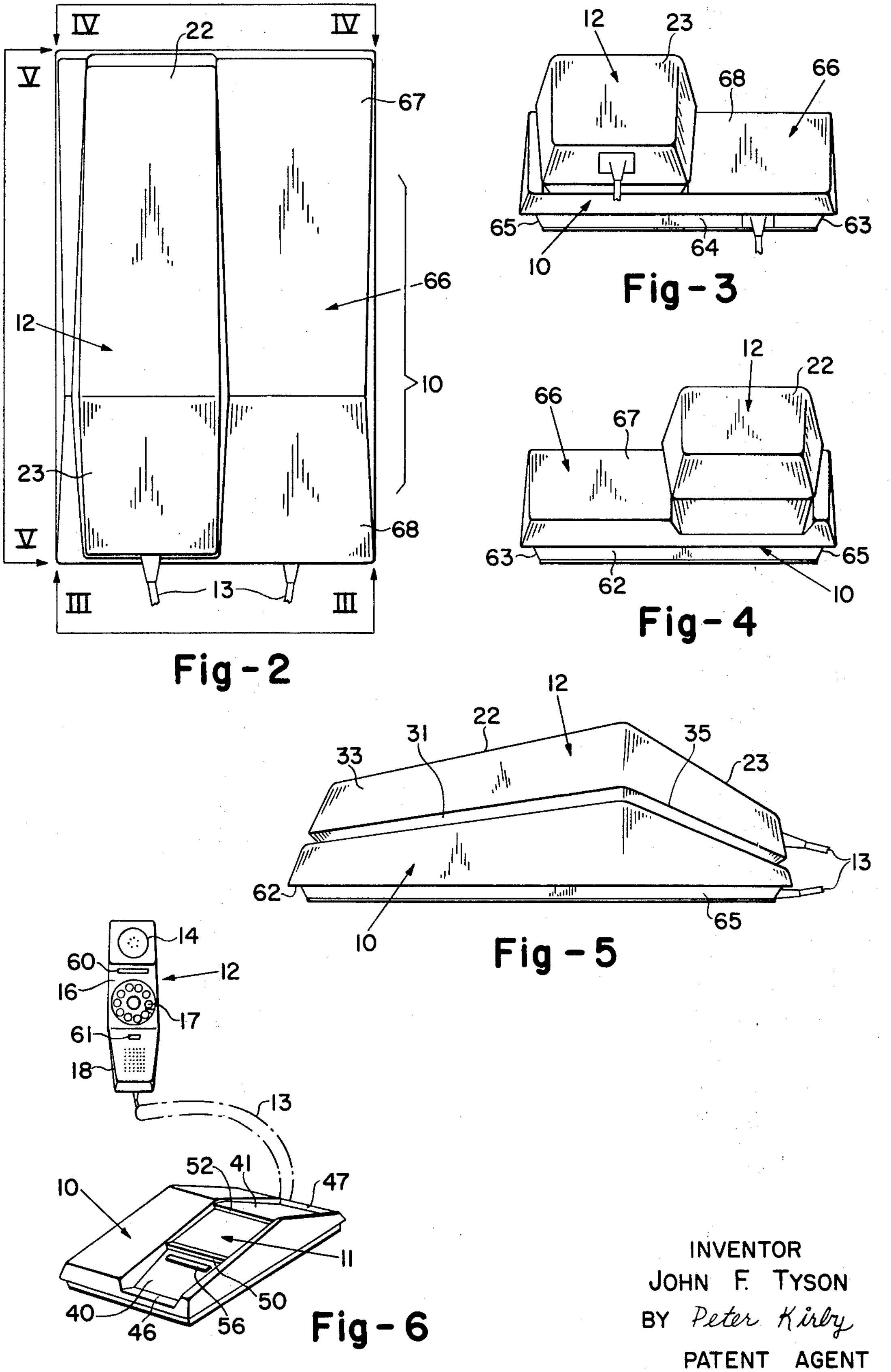
FIG. 2 is a plan view of the apparatus of FIG. 1.
FIG. 3 is a front elevation taken on III—III in FIG. 2.
FIG. 4 is a rear elevation taken on IV—IV in FIG. 2.
FIG. 5 is a side elevation taken on V—V in FIG. 2.
FIG. 6 is a rear perspective view with the handset raised.

As is clearly seen in FIGS. 1 to 4, the socket 11 is formed asymmetrically in the base 10, in that the latter extends laterally from the socket to provide an extended casing portion 66 projecting more to one side of the handset 12 than the other. As will be explained below in connection with alternative embodiments, these dimensional considerations obviously can be varied, largely to suit the space requirements of the electrical equipment. If miniaturized equipment were used, or some of the equipment (e.g. the ringer) were mounted in other housings for example, the extended casing portion 66 could be dispensed with. The base 10 would then only have to be wider than the handset 12 by an amount sufficient to provide the socket 11 with the necessary upstanding lateral edges for containing the handset. On the other hand, in some circumstances, a few of which will be further referred to below in connection with alternative embodiments of the apparatus, the casing portion 66 may be extended laterally further than is shown in FIGS. 1 to 4, or may be extended to the left hand side of the handset (as seen in FIG. 2) either in addition to, or as an alternative to, extending to the right as shown.

However, returning to a consideration of the apparatus as actually shown in FIGS. 1 to 10, it will be seen that the casing portion 66 generally follows the humped or angulated shape of the handset 12 by providing a first planar casing surface 67 extending parallel to the back face surface 22 of the first arm 24 of the handset, and a second planar casing surface 68 extending parallel to the back face surface 23 of the second arm 25 of the handset. The surfaces 67 and 68 define between them an upward angle substantially equal to the outer angle A defined by the surfaces 22 and 23.

A valuable manufacturing advantage of the structure described resides in the fact that identically the same base and handset configurations can, without loss of facilities, be used either as a table instrument in a horizontal orientation, or as a wall instrument with a vertical orientation. The horizontal orientation has been shown in the views so far described, and the vertical orientation will now be described with particular reference to FIGS. 11 to 14.

FIGS. 11 and 12 show the instrument mounted on a wall 70 and, in this orientation, the weight of the handset 12 draws tightly together the lip and main shelf surfaces 29 and 50. As is clearly apparent from FIG. 12, the interface defined by these surfaces is inclined to the horizontal by an angle K of the order of 15° to 25° (and preferably 20°), such inclination being inwardly (towards the base 10) and downwardly, so that the weight of the handset acts to urge it inwardly of the socket. This ensures both that the handset is securely supported and that the switch hook 56 is firmly actuated (depressed).

FIGS. 13 and 14 are views corresponding to FIGS. 11 and 12, but showing the handset 12 supported in a different position, this being the so-called third party position, namely a position in which the handset 12 can be rested without actuating the switch hook 56 while a third party is called to the telephone. In this third party position the lip surface 29 engages the lower shelf surface 52 and the heel 71 of the handset bears against the wall 70. While the lower shelf surface 52 is shown shallower than the main shelf surface 50 it will necessarily be both sufficiently deep and sufficiently downwardly and inwardly inclined (e.g. about 10° to the horizontal) to support the handset reliably in this position. It will be noted that the projection 51 and its shelf surface 52 are hidden from view when the handset is cradled in the normal position in the socket (FIG. 11).

A further feature of the apparatus in the vertical orientation is shown in FIGS. 11 and 12 where utilization of the groove 62 to support a pencil 72 is demonstrated.

This description returns now to consideration of the apparatus in the horizontal orientation, in connection with a so-called reverse seating of the handset in the base socket. In this regard, attention is primarily directed to FIG. 15 which shows the handset 12 so disposed, a portion of its planar back face surface 22 engaging the second end socket surface 41, while a portion of the other planar back face surface 23 of the handset is supported by the second end face 47 of the socket. In connection with this reverse position of the handset, it will be appreciated that it is important that the end face 47 of the socket should be inclined to the horizontal in the sense opposite to that of the socket surface 41 (see FIG. 8) and that the angle D defined by the face 47 and the surface 41 should be complementary to the angle A defined by surfaces 22 and 23 of the handset (in the sense that $A+D=360°$), in order that a firm seat for the handset in a predetermined location should be formed. In addition, the angle D must be at least as great as the angle formed by the surfaces of the handset at its heel 71 in order to accommodate the handset in its normal position.

The reverse seating position of the handset may be used as a third party position in the horizontal orientation of the apparatus; it may also be used as a position in which to rest the handset during a dialing operation. In this connection a non-slip friction strip 73 of rubber or other suitable material may be secured to the surface 41, such as in the manner shown in FIG. 16, to enhance the stability of the handset in this reverse seating position.

FIG. 17 shows an alternative arrangement of a switch hook 56*a* extending longitudinally along, instead of transversely across, the socket surface 40. As before, this switch hook is adapted to be actuated by the end portion 14 of the handset. This arrangement has the advantage that the switch hook 56*a* will be operated, even if the handset is placed the wrong way around end for end in the socket.

FIGS. 18 and 19 show a modification of the basic apparatus, in which no switch hook is provided in the base, a switch hook 74 being located instead in the handset 12 in the vicinity of the lip surface 29. The switch hook 74 can then serve the additional function of a recall switch, so that no separate recall switch, such as the switch 61, need be provided. In its function as such, the switch hook 74 is actuated by a projecting ridge surface 75 which constitutes a somewhat extended version of the ridge 49 of FIGS. 7 and 8. The switch 74 will be actuated by pressure of the handset 12 inwardly of the base socket, whether such pressure is the result of the direct effect of the weight of the handset, as in the horizontal orientation, or whether it is the result of the indirect effect of the weight of the handset, as in the vertical orientation.

It will be observed that, in the forms of apparatus so far described, the cord 13 has been shown extending into the base 10 at a location in the front groove 64. As shown in FIG. 20, if preferred, the cord 13 may be connected into the base at a location in the side groove 65.

FIG. 21 shows another modification in which the rotary dialing mechanism 17 has been located in the surface 68 of the casing portion 66 of the base, the central portion 77 of the handset 12 now being plain except for the name plate recess 60.

In FIG. 22 a similar arrangement is shown, except that the dialing mechanism 17 has now been placed in the surface 67 of the casing portion 66 of the base, this arrangement being more suited to the vertical orientation as a wall instrument.

FIG. 23 shows another alternative arrangement in which a pushbutton type of dialing mechanism 78, e.g. the form of mechanism sold under the Northern Electric Company Registered trademark "Digitone," is mounted in the surface 68. As before, the mechanism 78 may alternatively be mounted in the surface 67, as shown in FIG. 24.

FIG. 25 shows yet another arrangement in which a pushbutton type of dialing mechanism 78 mounted in the surface 68 (or it could equally well be in the surface 67 in a wall instrument) is provided simultaneously with a rotary dial type of mechanism 17 mounted in the handset 12. If preferred, the pushbutton mechanism can be mounted in the handset, either alone or in combination with a rotary dial mechanism in the base. One advantage of combining the two types of dialing mechanism in a single instrument is to enable the apparatus to be usable during a transitional stage when part of the telephone system is adapted for rotary dialing and part is adapted for pushbutton dialing. It may also be used for systems in which the rotary dial is used to establish communication through a conventional crossbar telephone exchange with a computer, subsequent input to the computer then taking place by the medium of the digital pushbutton keyboard.

FIG. 26 shows a variant in which a speaker type of telephone microphone 80 and controls 81 are mounted in the base surface 68. FIG. 27 shows yet another variant in which the pushbutton mechanism 78 is mounted in the handset 12.

The shape of the casing portion 66 is especially conducive to so-called "modulation" of the apparatus, that is to say extension of the casing portion 66 laterally to almost any extent required to house additional equipment. The casing portions 66 shown in FIGS. 21 to 27 may have to be extended laterally to some minor extent, in relation to the casing portion 66 as shown in FIGS. 1 to 4, in order to accommodate the additional equipment, such as the dialing mechanisms and their associate parts. However, an important aspect of the casing shape resides in the fact that it lends itself to a much greater lateral extension than can as a matter of practical engineering be contemplated in a conventional telephone instrument. This factor is well demonstrated by the manner in which the casing portion of the base has been extended in the examples illustrated in FIGS. 28 and 29, the first of which shows so-called "Call Director" pushbutton controls and indicators 83 spread out along a much extended casing portion 66*a*. FIG. 29 shows a similarly extended casing portion 66*a* with controls 84 and a raised housing 85 which may serve many possible functions, for example to house video or display equipment. In either of these latter arrangements the handset may contain a dialing mechanism.

I claim:

1. The housing structure of a telephone instrument for mounting without modification either in a horizontal orientation as a table instrument or in a vertical orientation as a wall instrument, comprising:

(a) an elongated handset having a first end portion, a second end portion and a central portion intermediate said end portions, said handset also defining a front face and a back face, (b) the back face of the handset comprising a first rear plane surface extending over the second end portion, and a second rear plane surface intersecting said first plane surface to define a predetermined outer angle A therewith, (c) the front face of the handset comprising a front surface extending along the second end portion, and a projecting front portion extending along the first end portion, one extremity of said projecting front portion defining with said central portion a planar lip surface extending across the full width of the front face of the handset, (d) a base defining an elongated socket for receiving the front face of the handset in a normal forward position, and for removably retaining the handset in such position in said socket, (e) said socket comprising first and second generally planar end socket surface each sloping downwardly and outwardly from the longitudinal centre of the socket in the horizontal orientation of the instrument for respectively receiving and supporting in generally parallel face-to-face relationship said projecting front portion and said front surface of the handset, (f) the first end socket terminating towards the longitudinal centre of the socket in a planar shelf surface that extends across the full width of the socket for cooperation in the vertical orientation of the instrument with said lip surface for pressing the handset inwardly of the socket to support the handset, (g) said socket further including a downwardly and inwardly sloping, generally planar, first end face intersecting said first end socket surface, (h) said socket further including a downwardly and inwardly sloping, generally planar, second end face forming an extension of the second end socket surface and defining an upwardly facing angle D therewith, said angles A and D being together equal to 360° to provide a firm seat for supporting the handset in the socket in a reversed position with its back face directly supported by the base, (i) said end socket surfaces and said end faces of the socket together cooperating with the front face of the handset in the horizontal orientation of the instrument to urge the handset in its forward position longitudinally into true alignment with said socket from a location slightly longitudinally misaligned with said socket in either direction and to urge said handset firmly into the socket.

2. The structure of claim 1, including switch hook means located for actuation by inward pressure of the handset into said socket.

3. The structure of claim 2 including a further planar shelf surface extending across the full width of said socket parallel to and spaced from said lip surface-supporting shelf surface at a location below said latter shelf surface in the vertical orientation of the instrument, said further shelf surface being oriented for cooperation with said lip surface for supporting the handset in a hanging position in which said switch hook means remains unactuated.

4. The housing structure of a telephone instrument for mounting without modification either in a horizontal orientation as a table instrument or in a vertical orientation as a wall instrument, comprising:

(a) an elongated handset having a first end portion, a second end portion and a central portion intermediate said end portions, said handset also defining a front face and a back face, (b) a base defining an elongated socket for receiving the front face of the handset and for removably retaining the handset therein, said socket including an upper portion for receiving said first end portion of the handset, a lower portion for receiving said second end portion of the handset and a central portion for alignment with said central portion of the handset, (c) the front face of said handset including a planar lip surface located between said first end portion and said central portion, and said socket including a main planar shelf surface located for cooperation with said lip surface, said lip and shelf surfaces extending across the full width of the handset and socket respectively and being oriented for pressing the handset inwardly of the socket while supporting the handset in vertical orientation, (d) switch hook means located for actuation by inward pressure of the handset into the socket, (e) and a further planar shelf surface formed in and extending across the full width of said socket parallel to and spaced from said main shelf surface at a location vertically below said main shelf surface, said further shelf surface being oriented for cooperation with said lip surface for supporting the handset in a vertical orientation at a second location in which said switch hook means remains unactuated, (f) said further shelf surface being located between said lower and central portions of said socket whereby, when supported in said second location, the first end portion of the handset is in alignment with said central portion of the socket and the central portion of the handset is in alignment with said lower portion of the socket.

5. The housing structure of a telephone instrument for mounting without modification either in a horizontal orientation as a table instrument or in a vertical orientation as a wall instrument, comprising:

(a) an elongated handset having a front face and a back face and having a first end portion, a second end portion and a central portion intermediate said end portions, (b) a base defining a socket for receiving the front face of the handset and for removably retaining the handset therein, (c) said back face of the handset comprising a first plane surface extending over the first end portion and the central portion, and a second plane surface extending over the second end portion, said plane surfaces intersecting each other to define a predetermined outward angle A, (d) said handset and said socket together providing first cooperating surface means for pressing the handset inwardly of the socket to support the handset in the vertical orientation of the instrument, (e) said handset and said socket together providing further cooperating surface means for urging the handset into the socket in the horizontal orientation of the instrument, (f) said socket including first and second surfaces oriented generally to complement and support front faces of said first and second end portions respectively of the handset when the latter is cradled in the horizontal orientation of the instrument with its front face downwardly in the socket, (g) the second said end socket surface being generally planar and inclined to the horizontal in the horizontal orientation of the instrument for supporting said first plane surface when the handset is in a reversed position with its back face supported by the base, (h) and said socket further including an inwardly sloping end face for supporting said second plane surface of the handset in such reversed position of the handset, said end face of the socket forming an extension of said second end socket surface, being inclined to the horizontal oppositely thereto, and defining an upward angle D therewith, wherein $A+D=360°$, to form a firm seat for the handset in said reversed position.

6. The housing structure of a telephone instrument for mounting without modification either in a horizontal orientation as a table instrument or in a vertical orientation as a wall instrument, comprising:

(a) an elongated handset having a front face and a back face and having a first end portion, a second end portion and a central portion intermediate said end portions, (b) a base defining a socket for receiving the front face of the handset and for removably retaining the handset therein, (c) switch hook means located for actuation by inward pressure of the handset into the socket, (d) said handset and said socket together providing first cooperating surface means for pressing the handset inwardly of the socket to actuate said switch hook means while supporting the handset in the vertical orientation of the instrument, (e) said handset and said socket together providing further cooperating surface means for urging the handset into the socket to actuate the switch hook means in the horizontal orientation of the instrument, (f) said back face of the handset comprising a first plane surface extending over the first end portion and the central portion, and a second plane surface extending over the second end portion, said plane surfaces intersecting each other to define a predetermined outward angle A, (g) said front face of the handset including a third generally plane surface extending over the central portion and a fourth generally plane surface extending over the second end portion, said third and fourth surfaces intersecting each other so that said second end portion of the handset is angulated with respect to the central and first end portions thereof, (h) the overall shape of said socket being angulated complementarily to said handset and including first and second end socket surfaces for supporting front faces of said first and second end portions respectively of the handset, (i) the second said end socket surface being generally planar and inclined to the horizontal in the horizontal orientation of the instrument for supporting said fourth plane surface when the handset is cradled normally with its front face downwardly in the socket and for supporting said first plane surface when the handset is in a reversed position with its back face supported by the base, (j) said socket further including an inwardly sloping end face for supporting said second plane surface of the handset in such reversed position of the handset, said end face of the socket forming an extension of said second end socket surface, being inclined to the horizontal oppositely thereto, and defining an upward angle D therewith, wherein $A+D=360°$, to form a firm seat for the handset in said reversed position.

7. The housing structure of a telephone instrument, comprising:

(a) an elongated handset having a front face and a back face and having a first end portion, a second end portion and a central portion intermediate said end portions, (b) a base for horizontal orientation as a table instrument, said base defining a generally upwardly facing socket for receiving the front face of the handset and for removably retaining the handset therein, (c) said back face of the handset comprising a first plane surface extending over the first end portion and the central portion, and a second plane surface extending over the second end portion, said plane surfaces intersecting each other to define an angle A therebetween, (d) said socket including first and second end socket surfaces oriented generally to complement and support front faces of said first and second end portions respectively of the handset when the latter is cradled with its front face downwardly in the socket, (e) said second end socket surface being generally planar and inclined to the horizontal for supporting said first plane surface when the handset is in a reversed position with its back face supported by the base, (f) said socket further including an inwardly sloping end face for supporting said second plane surface of the handset in such reversed position of the handset, said end face forming an extension of said second end socket surface, being inclined to the horizontal oppositely thereto, and defining an angle D therewith, wherein $A+D=360°$, to form a firm seat for the handset in said reversed position.

8. The housing structure of a telephone instrument for mounting either in a horizontal orientation as a table instrument or in a vertical orientation as a wall instrument, comprising:

(a) an elongated handset having two end portions, a front face and a back face, and including an indented surface on the front face, (b) a base defining an elongated socket for receiving and supporting the front face of the handset in a normal forward position, (c) said socket comprising side wall means, bottom surface means, first outwardly sloping end surface means at one end of the socket, second outwardly sloping end surface means at the other end of the socket and a projection disposed closer to said first end surface means than to said second end surface means and defining a shelf surface sloped in the same direction as said first end surface means, (d) the second end surface means and the portion of the bottom surface means adjacent thereto defining cooperating surfaces for firmly seating said handset at a predetermined location on said base in a predetermined reversed position with its back face directly supported by the base, (e) the slope of the second end surface means being such as to cooperate with one end of the handset in its forward position in the horizontal orientation of the instrument to urge the handset longitudinally from a location slightly longitudinally misaligned with said socket, such misalignment being towards the second end surface, over the shelf surface into contact with said first end surface, (f) the slope of the first end surface means being such as then to cooperate with the other end of the handset in its forward position in the horizontal orientation of the instrument to urge the handset longitudinally into its most inward aligned normal forward position, (g) the slope of the shelf surface being such as to cooperate with said indented surface of the handset to cause the handset to slide firmly into said most inward position in the socket in the vertical orientation of the instrument.

9. The structure of claim 8 wherein:

(h) said second end surface means and the portion of the bottom surface means cooperating therewith for seating said handset in said reversed position comprise planar surfaces defining between them an upwardly facing angle D, (i) and said back face of the handset comprises first and second rear planar surfaces intersecting each other to define an outer angle A, where $A+D=360°$.

10. The housing structure of a telephone instrument, comprising:

(a) an elongated handset having a front face and a back face and having a first end portion, a second end portion and a central portion intermediate said end portions, (b) a base for horizontal orientation as a table instrument, said base defining a generally upwardly facing socket for receiving the front face of the handset and for removably retaining the handset therein, (c) said back face of the handset comprising a first plane surface extending over the first end portion and the central portion, and a second plane surface extending over the second end portion, said plane surfaces intersecting each other to define an angle A therebetween, (d) said socket including first and second end socket surfaces oriented generally to complement and support front faces of said first and second end portions respectively of the handset when the latter is cradled with its front face downwardly in the socket, (e) said second end socket surface being generally planar and inclined to the horizontal for supporting said first plane surface when the handset is in a reversed position with its back face supported by the base, (f) said socket further including an inwardly sloping end face for supporting said second plane surface of the handset in such reversed position of the handset, said end face forming an extension of said second end socket surface, being inclined to the horizontal oppositely thereto, and defining an angle D therewith, wherein $A+D=360°$ to form a firm seat for the handset in said reversed position, (g) the front face of the handset includes a lip surface located between said first end portion and said central portion, (h) said socket includes a shelf surface located for cooperation with said lip surface for inhibiting horizontal longitudinal displacement of the handset outwardly of the socket in the direction with said second end portion of the handset leading, (i) and including a further shelf surface formed in said socket parallel to and spaced from said main shelf surface at a location below the first said shelf surface in the vertical orientation of the instrument, said further shelf surface being oriented for cooperation with said lip surface for supporting the handset in a position in which said switch hook means remain unactuated, (j) and wherein said socket includes an inwardly sloping end face for cooperation with the handset in the horizontal orientation of the instrument for urging said lip and first shelf surfaces into engagement with each other.

References Cited

UNITED STATES PATENTS

| | | | |
|---|---|---|---|
| 3,073,911 | 1/1963 | Mattke et al. | 179—100 |
| 3,217,254 | 11/1965 | Hughes et al. | 179—100 |
| 3,396,244 | 8/1968 | Kowaleski | 179—100 |

KATHLEEN H. CLAFFY, Primary Examiner

J. S. BLACK, Assistant Examiner